May 5, 1936.  R. N. STEELE ET AL  2,040,032
PISTON
Filed Jan. 12, 1933  2 Sheets-Sheet 1

RAY N. STEELE  INVENTORS.
EARL E. McILVAIN
BY
Merrill M. Blackburn
ATTORNEY.

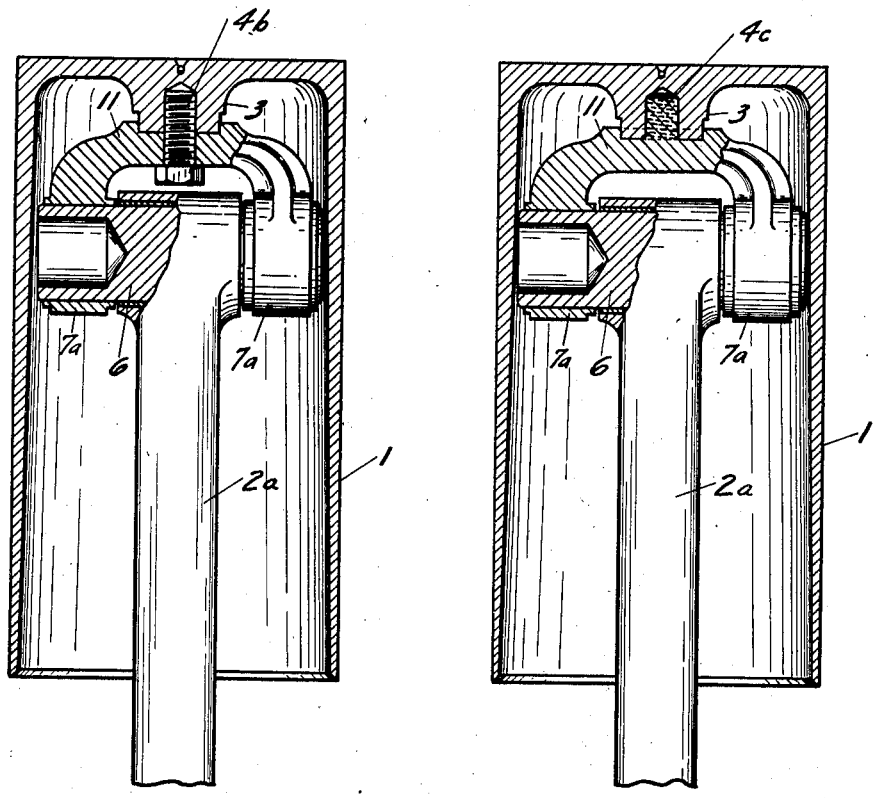

Patented May 5, 1936

2,040,032

UNITED STATES PATENT OFFICE

2,040,032

PISTON

Ray N. Steele and Earl E. McIlvain, Cedar Rapids, Iowa; said McIlvain assignor to said Steele Application January 12, 1933, Serial No. 651,302

8 Claims. (Cl. 309—16)

The present invention relates to improvements in pistons and relates more particularly to pistons used in internal combustion engines, in which, as is well known, the temperatures often run quite high and distortion is an important factor which must be reckoned with. Among the objects of this invention are to provide a piston of such a construction that the distortion thereof will be reduced to a minimum; to provide a piston which is easily manufactured and which can be produced with a great degree of accuracy and at a moderate price; to provide a piston of the character indicated in which the parts can be readily assembled and in which there will be very little tendency for these parts to work loose; and such further objects, advantages and capabilities as will hereafter appear and as are inherent in the construction disclosed herein. Our invention further resides in the combination, construction, and arrangement of parts illustrated in the accompanying drawings and, while we have shown therein what is now considered the preferred embodiment of this invention, we desire the same to be understood as illustrative only and not to be interpreted in a limiting sense.

In the drawings annexed hereto and forming a part hereof,

Figure 1:
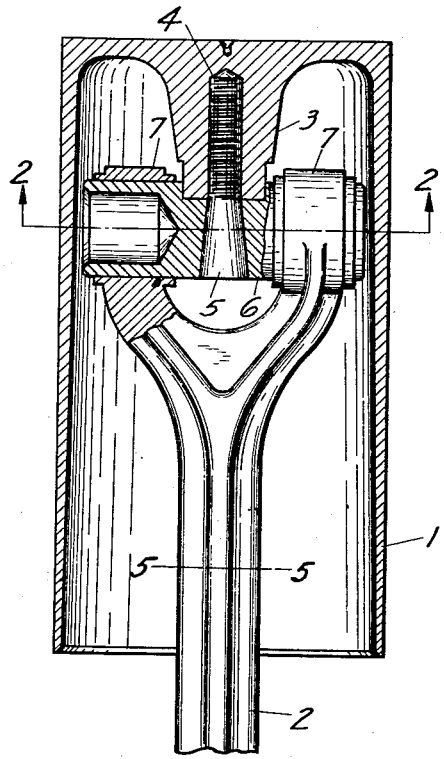
Fig. 1 is a longitudinal section of a piston embodying our present invention, with part of the connecting rod shown in elevation.
Figure 3:
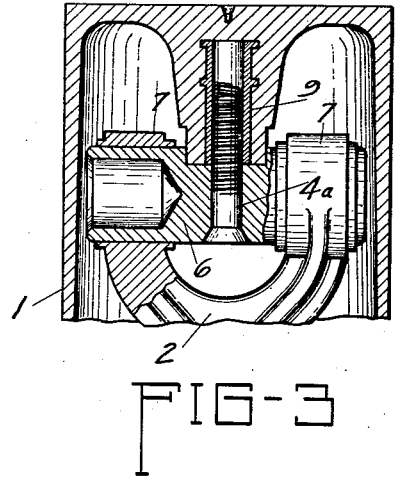
Fig. 3 is a fragmentary sectional view, similar to Fig. 1, showing a modified form of this construction.
Figure 4:
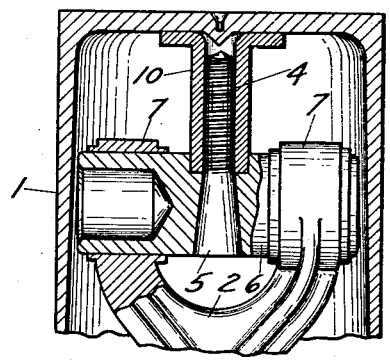
Figure 2:
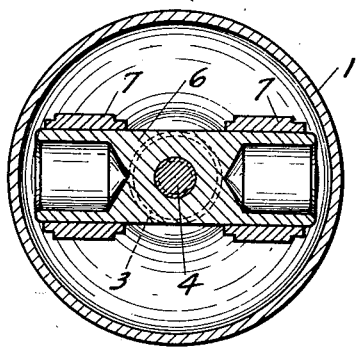
Fig. 2 is a transverse section of the structure shown in Fig. 1, taken substantially along the plane indicated by the line 2—2 of that figure.
Figure 5:

Fig. 4, similar to Fig. 3, is a further modified form of this invention;

Fig. 5 is a transverse section substantially along the plane indicated by the line 5—5, Fig. 1;

Figs. 6 and 7 show two structures adapted to be used in connection with standard piston rods, as replacement structures, to be substituted for ordinary pistons in used machines.

Reference will now be made in greater detail to the annexed drawings illustrating our present invention. While this invention is designed more particularly for use with ringless pistons, it will be understood that it is not necessarily limited to such use and may be utilized in connection with pistons provided with piston rings. In these drawings, the piston is denoted by the numeral 1 and the connecting rod by the numeral 2. The piston is provided, at the middle of its head, with a single post 3 which is substantially centrally apertured, the aperture having screw threads for the reception of the screw-threaded end of the bolt 4. This bolt has a tapered body 5 which fits in a correspondingly shaped opening through the wrist pin 6. In assembling the construction, the bolt 4 is driven tightly into the opening in the pin 6 so that there is no chance for the two to work relatively to each other. The wrist pin 6 has a flattened depression on the side toward the post 3 and the two abutting faces are preferably machined so that they will fit each other quite accurately. As shown in the drawings, the two ends of the wrist pin are made hollow, this being for the sake of lightening, as much as possible, the weight of the moving parts, and yet retain the requisite degree of strength.

In assembling this construction, the pin 6 is first placed in the eyes at the end of the connecting rod which is to be connected to the piston proper. Now, with the wrist pin in place, the bolt 4 is driven into position therein and then the pin is turned in the eye 7 until the bolt projects directly out beyond the end of the connecting rod. This bolt is now screwed into the opening in the post 3. It is desirable to avoid twisting the connecting rod and a pipe of a sufficient diameter to pass outside of the connecting rod and inside of the sleeve 1 is then slipped into place inside of the piston. This tube must have notches in its inserted end which are large enough to straddle the eyes 7 so that when the tube or pipe is turned the bolt 4 will also be turned. It will of course be understood that the bolt 4 should be driven into the pin 6 until the two fit sufficiently tightly so that the bolt can be turned into the post 3 without disturbing the connection between the bolt and pin.

As illustrated in Fig. 3, the present invention comprises the use of a beaded bolt, as well as the tapered bolt shown in Fig. 1. Also, it may be found desirable, when using aluminum or similar metals for the piston, to cast the latter about a sleeve 9 of tougher metal so that the threads thereof will not be stripped by the bolt 4a.

It may be found desirable to make the piston of pressed metal to which a sleeve 10 is welded, as indicated in Fig. 4. However, this is not considered at the present time as being as practicable as the structures shown in Figs. 1 and 3.

While the cross sectional shape of the connecting rod shown in Fig. 5 is considered as giving the greatest amount of strength for a given diameter of rod, this is not to be considered in any way as an essential part of the invention.

The structures shown in Figs. 6 and 7 are not essentially different, the only difference being that in the structure shown in Fig. 6 a bolt 4b passes through a yoke 11 and into the post 3, while in Fig. 7 a screw-threaded lug 4c extends from the face of the yoke into the opening in the post, being an integral part of the yoke. In these constructions, the connecting rod may be any one of several standard varieties now in use, this piston being designed for use with such standard rods so that it will not be necessary, when substituting for the old pistons, to substitute also for the old connecting rods. The wrist pin in these constructions is seen not to have the flattened portion on the side thereof for engagement with the face of the post but to be subsantially cylindrical in form to pass through and connect the connecting rod 2a with the eyes 7a at the ends of the yoke 11.

While neither ring grooves nor oil grooves have been shown in any of the figures, it will be understood that either may be provided, as desired.

It will of course be understood that the specific description of structures set forth above may be departed from without departing from the spirit of our invention as set forth above and in the appended claims.

Having now described our invention, we claim:

1. In a piston, a substantially cylindrical wall having one end closed and imperforate, a post extending from the inner face of said end and arranged substantially centrally with relation thereto, and a wrist pin connected to the end of said post by a single bolt having its head directed toward the open end of the piston.

2. A piston comprising a substantially cylindrical imperforate wall having a transverse wall extending across the opening through the piston and closing the same, said transverse wall having a single substantially centrally located post provided with a longitudinal opening extending substantially coaxially with the cylindrical wall of the piston, a wrist pin having a face shaped to fit the free end of the post, and means connecting the wrist pin immovably to the end of the post.

3. A structure as defined by claim 2 in which the means connecting the wrist pin to the post has a tapered body fitting a correspondingly tapered opening through the wrist pin.

4. A structure as defined by claim 2 having a taper headed bolt connecting the wrist pin to the post.

5. A wrist pin for an engine piston having cylindrical end portions and a substantially centrally arranged portion to be connected to a post of a piston in immovable relation with respect to the piston, said central portion having a depressed part on one side machined to fit a similarly shaped portion of the post, and the pin having a tapered opening therethrough arranged centrally of the depressed part and perpendicular to the axis of the pin and the machined face.

6. A piston having a head and a skirt, a single post integrally connected to and depending from substantially the central part of said head, said post being spaced from the skirt and having a screw-threaded longitudinal bore, a wrist pin transversely bored approximately in the middle of its length, a screw-threaded means passing upwardly through the bore in the wrist pin and engaging the screw threads in the post to connect the central part of the wrist pin to the post immovably.

7. A piston comprising an imperforate substantially cylindrical skirt, a substantially flat head extending across one end of said skirt and closing said end, said head having a single substantially centrally located post depending therefrom and provided with a longitudinally screw-threaded opening extending substantially coaxially with said skirt, a wrist pin having a transverse bore and an intermediate external surface engaging said post, and a screw-threaded means passing upwardly through said bore in said wrist pin and engaging said screw threads in the opening in said post to connect the central part of said wrist pin immovably to the end of said post.

8. A piston having a head and a skirt, a single post integrally connected to and depending from substantially the central part of said head, said post being spaced from the skirt and having a screw-threaded longitudinal opening, screw-threaded means in the screw-threaded opening in said post, and a wrist pin attached at its middle portion by said screw-threaded means to said post, said screw-threaded means serving as the sole means securing the wrist pin to the post, said screw-threaded means being normally so rigidly connected to the post as to be immovable with relation thereto during the operation of the mechanism, and the surface of the inner end of the post being a surface of revolution described about the axis of the screw-threaded opening as an axis.

RAY N. STEELE.
EARL E. McILVAIN.